(12) United States Patent
Bostick et al.

(10) Patent No.: US 9,298,694 B2
(45) Date of Patent: *Mar. 29, 2016

(54) GENERATING A REGULAR EXPRESSION FOR ENTITY EXTRACTION

(71) Applicant: International Business Machines Corporation, Armonk, NY (US)

(72) Inventors: James E. Bostick, Cedar Park, TX (US); Keyur D. Dalal, Johns Creek, GA (US); John M. Ganci, Jr., Cary, NC (US); Craig M. Trim, Sylmar, CA (US)

(73) Assignee: International Business Machines Corporation, Armonk, NY (US)

(*) Notice: Subject to any disclaimer, the term of this patent is extended or adjusted under 35 U.S.C. 154(b) by 373 days.

This patent is subject to a terminal disclaimer.

(21) Appl. No.: 13/860,547

(22) Filed: Apr. 11, 2013

(65) Prior Publication Data

US 2014/0309984 A1 Oct. 16, 2014

(51) Int. Cl.
*G06F 17/20* (2006.01)
*G06F 17/27* (2006.01)

(52) U.S. Cl.
CPC .......... *G06F 17/273* (2013.01); *G06F 17/278* (2013.01)

(58) Field of Classification Search
CPC ......... G06F 17/20; G06F 17/21; G06F 17/27; G06F 17/272; G06F 17/2765; G06F 17/30; G06F 17/30091; G06F 17/30103; G06F 17/30424; G06F 17/3043; G06F 17/30442; G06F 17/30448; G06F 17/30634; G06F 17/30637; G06F 17/3064; G06F 17/30657

USPC .......... 704/1, 9; 707/705, 713, 765, 767, 766, 707/769

See application file for complete search history.

(56) References Cited

U.S. PATENT DOCUMENTS

| | | | | |
|---|---|---|---|---|
| 5,768,451 | A * | 6/1998 | Hisamitsu et al. | 382/309 |
| 6,442,295 | B2 * | 8/2002 | Navoni et al. | 382/229 |
| 6,687,697 | B2 * | 2/2004 | Collins-Thompson et al. | |
| 7,089,188 | B2 * | 8/2006 | Logan et al. | 704/270 |
| 7,689,588 | B2 * | 3/2010 | Badr et al. | 707/999.103 |
| 7,734,565 | B2 * | 6/2010 | Carnahan | |
| 7,810,030 | B2 * | 10/2010 | Wu et al. | 715/257 |
| 2003/0130977 | A1 * | 7/2003 | Oommen | 706/59 |
| 2005/0278292 | A1 * | 12/2005 | Ohi | G06F 17/2735 |
| 2006/0036649 | A1 | 2/2006 | Simske et al. | |
| 2007/0100812 | A1 | 5/2007 | Simske et al. | |
| 2008/0104056 | A1 * | 5/2008 | Li | G06F 17/30672 |
| 2010/0293451 | A1 | 11/2010 | Carus | |

(Continued)

OTHER PUBLICATIONS

Myka, Andreas, and Ulrich Güntzer. "Fuzzy full-text searches in OCR databases." Digital Libraries Research and Technology Advances. Springer Berlin Heidelberg, 1996. 131-145.*

(Continued)

*Primary Examiner* — Paras D Shah
(74) *Attorney, Agent, or Firm* — Fusheng Xu

(57) ABSTRACT

A computer receives a formatted query having a plain text word. The computer selects each character in the plain text word. The computer identifies a group of characters from a confusion matrix that are commonly confused with the character selected. The computer generates a set of characters for each character selected, wherein the set of characters begin with one of the each character selected followed by and ending with the group of characters from the confusion matrix. The computer generates a regular expression by concatenating each of the set of characters.

12 Claims, 6 Drawing Sheets

(56) References Cited

U.S. PATENT DOCUMENTS

| | | | | |
|---|---|---|---|---|
| 2011/0184723 A1* | 7/2011 | Huang et al. | | 704/8 |
| 2012/0078950 A1* | 3/2012 | Conrad et al. | | 707/769 |
| 2014/0089302 A1* | 3/2014 | Lapir et al. | | 707/723 |

OTHER PUBLICATIONS

Ohta, Manabu, Atsuhiro Takasu, and Jun Adachi. "Reduction of expanded search terms for fuzzy English-text retrieval." Research and Advanced Technology for Digital Libraries. Springer Berlin Heidelberg, 1998. 619-633.*

Kevin Larson; "The Science of Word Recognition or how I learned to stop worrying and love the bouma"; Advance Reading Technology, Microsoft Corporation; Copyright 2013 Microsoft Corporation; Printed Feb. 12, 2013; <http://www.microsoft.com/typography/ctfonts/WordRecognition.aspx>.

"Regular Expression Tutorial—Learn How to Use and Get the Most out of Regular Expressions"; Printed Feb. 12, 2013; <http://www.regular-expressions.info/tutorial.html/>.

Wikipedia; "Edit distance"; Printed Feb. 12, 2013; <http://en.wikipedia.org/wiki/Edit_distance>.

"Word Hy-phen-a-tion by Com-put-er"; Word Hy-phen-a-tion by Com-put-er, patgen—TeX Users Group; Printed Feb. 12, 2013; <http://www.tug.org/docs/liang/>.

* cited by examiner

SUB[X, Y] = SUBSTITUTION OF X (INCORRECT) FOR Y (CORRECT)

Y (CORRECT)

| X (INCORRECT) | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|
| a | 0 | 0 | 7 | 1 | 342 | 0 | 0 | 2 | 0 | 0 | 1 | 0 | 0 | 3 | 76 | 0 | 0 | 1 | 35 | 9 | 9 | 0 | 1 | 0 | 5 | 0 |
| b | 0 | 0 | 9 | 9 | 2 | 2 | 3 | 1 | 0 | 0 | 0 | 5 | 11 | 5 | 0 | 10 | 0 | 0 | 2 | 1 | 0 | 0 | 8 | 0 | 0 | 0 |
| c | 5 | 0 | 0 | 16 | 0 | 9 | 5 | 0 | 0 | 0 | 1 | 0 | 7 | 9 | 0 | 10 | 2 | 5 | 39 | 40 | 0 | 3 | 7 | 1 | 1 | 0 |
| d | 10 | 0 | 13 | 0 | 12 | 0 | 5 | 5 | 0 | 0 | 2 | 3 | 7 | 3 | 1 | 1 | 0 | 43 | 30 | 22 | 1 | 0 | 4 | 0 | 2 | 0 |
| e | 388 | 0 | 3 | 11 | 0 | 2 | 2 | 0 | 89 | 0 | 0 | 3 | 0 | 5 | 0 | 0 | 0 | 14 | 12 | 6 | 0 | 0 | 1 | 0 | 18 | 0 |
| f | 15 | 0 | 0 | 3 | 1 | 0 | 0 | 2 | 0 | 0 | 0 | 3 | 4 | 1 | 93 | 0 | 0 | 6 | 4 | 12 | 15 | 0 | 2 | 0 | 0 | 0 |
| g | 1 | 11 | 1 | 11 | 9 | 2 | 0 | 0 | 0 | 1 | 1 | 3 | 0 | 0 | 0 | 1 | 3 | 5 | 13 | 21 | 0 | 0 | 1 | 0 | 3 | 0 |
| h | 8 | 0 | 0 | 3 | 0 | 0 | 1 | 0 | 0 | 0 | 2 | 0 | 0 | 14 | 2 | 1 | 0 | 3 | 1 | 11 | 47 | 0 | 2 | 1 | 15 | 0 |
| i | 103 | 0 | 0 | 0 | 146 | 0 | 1 | 0 | 0 | 0 | 0 | 6 | 0 | 0 | 49 | 3 | 0 | 0 | 2 | 1 | 0 | 0 | 2 | 0 | 0 | 3 |
| j | 0 | 1 | 1 | 9 | 0 | 1 | 1 | 0 | 0 | 0 | 0 | 2 | 1 | 0 | 2 | 0 | 0 | 0 | 5 | 0 | 0 | 0 | 0 | 0 | 0 | 0 |
| k | 1 | 2 | 8 | 4 | 1 | 1 | 2 | 5 | 0 | 0 | 0 | 0 | 5 | 0 | 2 | 0 | 0 | 0 | 6 | 0 | 0 | 0 | 4 | 0 | 0 | 0 |
| l | 2 | 10 | 1 | 4 | 0 | 4 | 5 | 6 | 13 | 0 | 0 | 0 | 0 | 0 | 2 | 5 | 0 | 11 | 10 | 2 | 0 | 0 | 0 | 0 | 0 | 3 |
| m | 1 | 3 | 7 | 8 | 0 | 2 | 0 | 6 | 0 | 0 | 4 | 4 | 0 | 180 | 0 | 6 | 0 | 0 | 9 | 15 | 13 | 3 | 2 | 2 | 3 | 0 |
| n | 2 | 7 | 6 | 5 | 3 | 0 | 1 | 6 | 1 | 9 | 4 | 35 | 78 | 0 | 0 | 7 | 0 | 28 | 5 | 7 | 0 | 0 | 1 | 2 | 0 | 2 |
| o | 91 | 0 | 1 | 3 | 116 | 0 | 0 | 19 | 25 | 0 | 2 | 0 | 0 | 0 | 0 | 14 | 0 | 2 | 4 | 14 | 39 | 0 | 0 | 0 | 18 | 0 |
| p | 0 | 11 | 1 | 2 | 0 | 6 | 5 | 0 | 2 | 0 | 0 | 2 | 7 | 6 | 15 | 0 | 0 | 1 | 3 | 6 | 0 | 0 | 2 | 0 | 0 | 0 |
| q | 0 | 0 | 1 | 0 | 0 | 2 | 2 | 0 | 0 | 0 | 5 | 8 | 4 | 5 | 1 | 7 | 0 | 0 | 0 | 0 | 4 | 0 | 1 | 0 | 3 | 0 |
| r | 14 | 0 | 0 | 30 | 12 | 2 | 2 | 8 | 0 | 2 | 0 | 27 | 0 | 20 | 1 | 14 | 0 | 0 | 12 | 22 | 0 | 0 | 0 | 1 | 0 | 0 |
| s | 8 | 27 | 7 | 33 | 35 | 4 | 0 | 1 | 0 | 0 | 5 | 0 | 0 | 6 | 1 | 7 | 0 | 14 | 0 | 15 | 0 | 0 | 5 | 3 | 20 | 1 |
| t | 4 | 9 | 0 | 42 | 7 | 5 | 19 | 5 | 64 | 1 | 0 | 14 | 9 | 5 | 5 | 6 | 0 | 11 | 37 | 0 | 0 | 2 | 19 | 0 | 7 | 6 |
| u | 20 | 0 | 0 | 0 | 44 | 0 | 0 | 0 | 0 | 0 | 0 | 0 | 0 | 2 | 43 | 0 | 0 | 4 | 0 | 0 | 0 | 0 | 2 | 0 | 8 | 0 |
| v | 0 | 0 | 7 | 0 | 0 | 3 | 0 | 2 | 0 | 1 | 0 | 0 | 0 | 6 | 1 | 0 | 0 | 0 | 8 | 3 | 0 | 0 | 2 | 0 | 0 | 0 |
| w | 2 | 0 | 0 | 0 | 1 | 0 | 0 | 0 | 0 | 0 | 0 | 0 | 0 | 5 | 6 | 0 | 0 | 6 | 3 | 3 | 1 | 0 | 0 | 0 | 0 | 0 |
| x | 0 | 0 | 0 | 2 | 0 | 0 | 0 | 2 | 0 | 0 | 0 | 0 | 0 | 2 | 6 | 1 | 0 | 0 | 9 | 8 | 5 | 0 | 0 | 0 | 0 | 0 |
| y | 0 | 0 | 2 | 0 | 15 | 0 | 0 | 7 | 0 | 0 | 0 | 0 | 2 | 0 | 1 | 0 | 0 | 7 | 36 | 8 | 0 | 0 | 0 | 1 | 0 | 0 |
| z | 0 | 0 | 0 | 7 | 0 | 0 | 0 | 0 | 0 | 0 | 0 | 7 | 5 | 0 | 0 | 0 | 0 | 2 | 21 | 3 | 0 | 0 | 0 | 0 | 3 | 0 |

FIG. 3

GENERATING A REGULAR EXPRESSION FOR ENTITY EXTRACTION

BACKGROUND

1. Field of the Invention

The present invention relates generally to regular expressions for natural language processing, and more specifically to generating a regular expression, utilized for entity extraction, that can identify a word or a phrase having the word within text data (i.e., one or more strings of text) even if the word is misspelled.

2. Description of the Related Art

The tremendous growth of the Internet and computer storage capabilities has enabled people to have access to massive amounts of electronically stored data, wherein the data includes text data (i.e., one or more strings of text) stored on a computer readable tangible storage device. There are various computer software programs utilized as search tools capable of searching and identifying information within the text data. Specifically, it is known to utilize search tools having a regular expression to identify one or more specific words within the text data, in order to perform entity extraction. However, if the text data is not validated prior to being stored on the computer readable tangible storage device, then there can be a misspelling of a word within the text data. The misspelling of a word within the text data can result in a search tool not being able to identify the word that is misspelled even if the word is only slightly misspelled, which can further result in inaccurate and imprecise information entity extraction results.

SUMMARY

Aspects of an embodiment of the present invention disclose a method, computer system, and program product for generating a regular expression utilized for entity extraction. The computer receives a formatted query having a plain text word. The computer selects each character in the plain text word. The computer identifies a group of characters from a confusion matrix that are commonly confused with the character selected. The computer generates a set of characters for each character selected, wherein the set of characters begin with one of the each character selected followed by and ending with the group of characters from the confusion matrix. The computer generates a regular expression by concatenating each of the set of characters.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

FIG. 3 illustrates an example of the confusion matrix of FIG. 1 according to an embodiment of the present invention.

DETAILED DESCRIPTION

Figure 1:
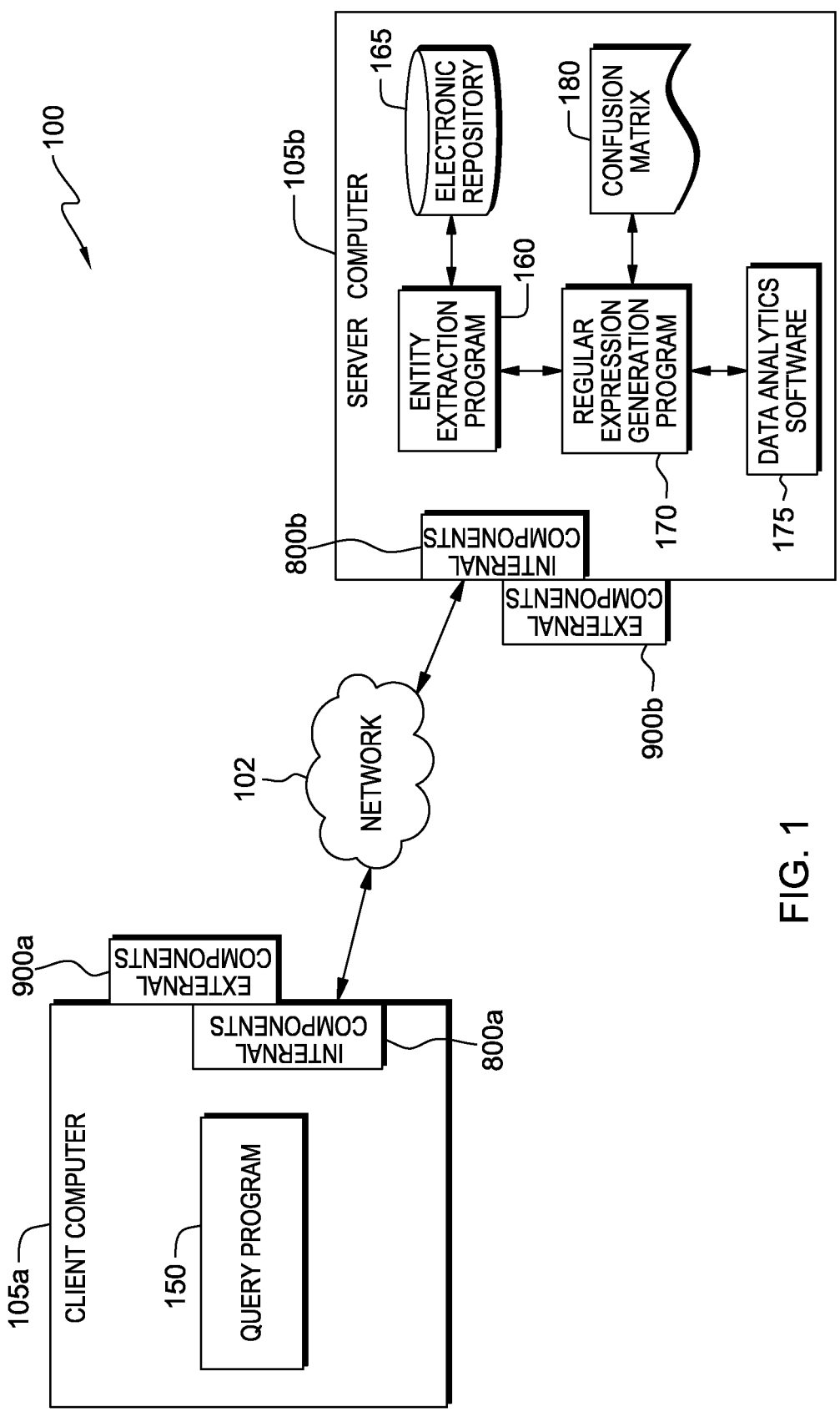
FIG. 1 is a block diagram of a distributed computer system, including a client computer having query program that interacts with a regular expression generation program on a server computer, wherein the regular expression generation program utilizes a confusion matrix to generate a regular expression according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a regular expression generation program having program code for generating a regular expression, utilized for entity extraction, that can identify a word or a phrase having the word within text data (i.e., one or more strings of text) even if the word is misspelled. A regular expression is a specific pattern that provides a way to match (i.e., define and identify) strings of text such as specific characters, words, or patterns of characters within text data. As a result, the regular expression generation program can yield search results (e.g., extract entity information) that have high degree of accurate and precision.

FIG. 1 illustrates computer system 100 that includes network 102, client computer computer 105a having query program 150 installed, and server computer 105b having entity extraction program 160, regular expression generation program 170, and data analytics software 175 installed. Server computer 105b includes electronic repository 165 for storing data (e.g., text data, electronic documents, and electronic images), and confusion matrix 180 utilized by regular expression generation program 170 for generating a regular expression based on a query. In addition, client computer 105a and server computer 105b each include respective internal components 800a and 800b, and respective external components 900a and 900b, as described below in more detail with respect to FIG. 4.

Query program 150 is a software tool that can send a query to entity extraction program 160 in order to retrieve data from electronic repository 165. In response to receiving a query from query program 150, entity extraction program 160 can extract data from electronic repository 165. However, to accurately extract the data based on the query received, entity extraction program 160 sends a version of the query to regular expression generation program 170. Regular expression generation program 170 is program code that generates a regular expression by utilizing confusion matrix 180, the version of the query received by entity extraction program 160, and data from data analytics software 175. Entity extraction program 160 can utilize the regular expression that is generated to accurately identify a string of text within the data stored in electronic repository 165 even if the string of text is misspelled. Upon accurately identifying the string of text within the data entity extraction program 160 can extract the data, and send the data to the end-user.

Figure 2A:
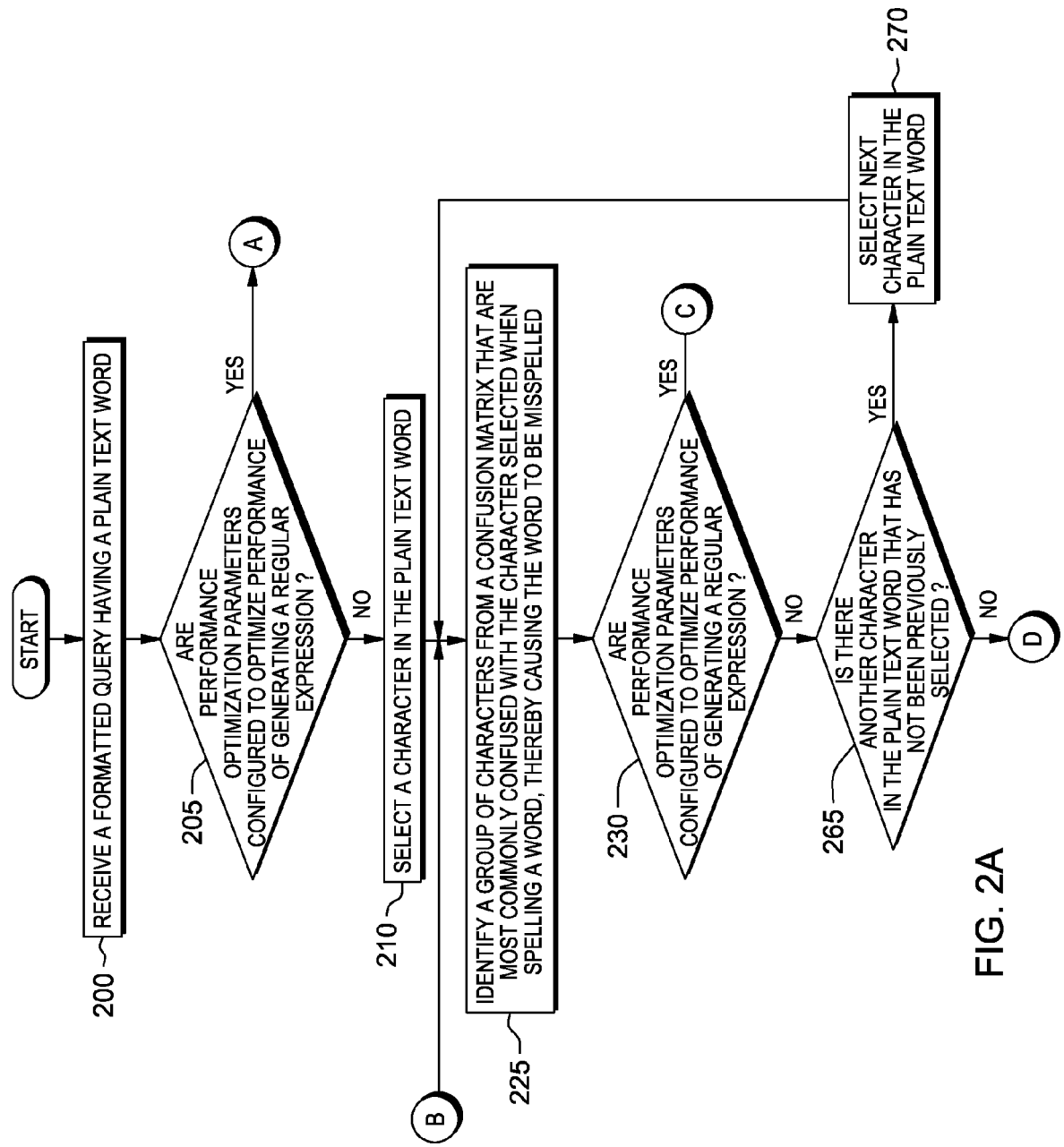
FIGS. 2A-2C are flowcharts illustrating operations of the regular expression generation program utilizing the confusion matrix of FIG. 1 to generate the regular expression utilized for identifying a word or a phrase having the word within text data, wherein the regular expression can be utilized to perform entity extraction according to an embodiment of the present invention.
Figure 2B:
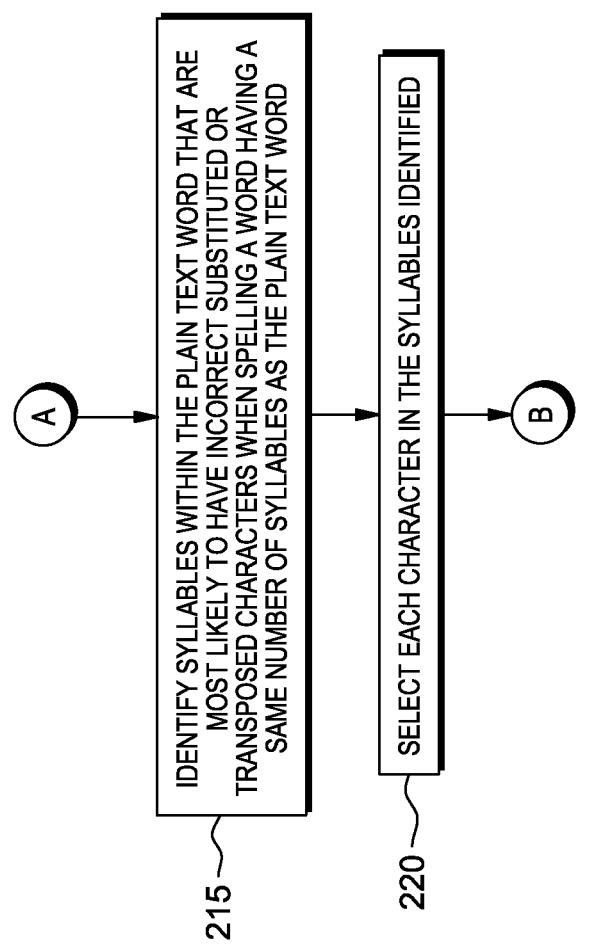
Figure 2C:
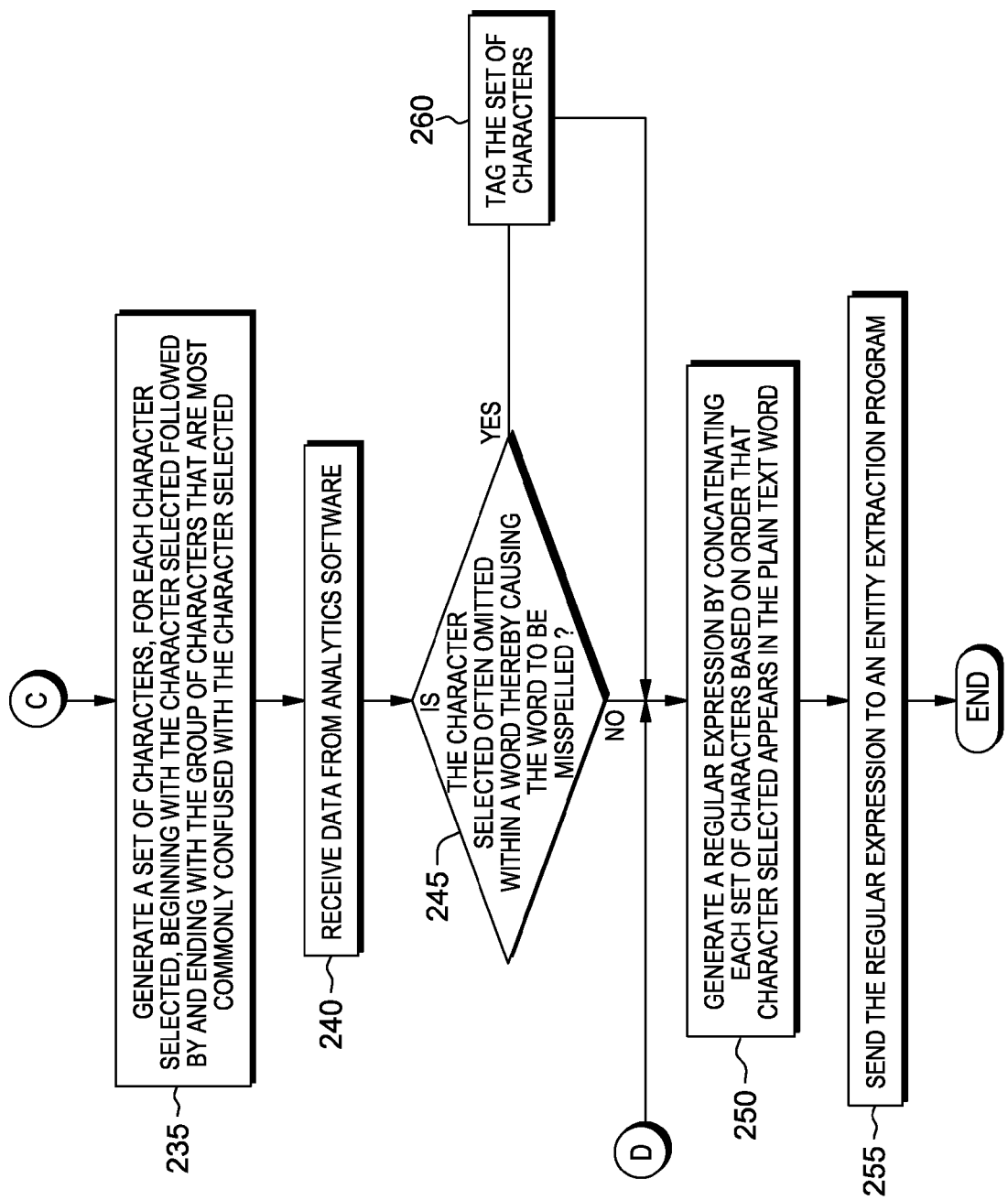

FIGS. 2A-2C are flowcharts illustrating the steps of the program code of regular expression generation program 170 in more detail. In response to an end-user sending, via query program 150, a query having a plain text word to server 105b, entity extraction program 160 can process the query into a format that is recognizable by regular expression generation program 170. Subsequent to processing the query, entity extraction program 160 can send the formatted query to regular expression generation program 170. Thus, regular expression generation program 170 is program code that receives a formatted query having a plain text word (block 200). Thus, in the disclosed embodiment the formatted query can have a specified format. The specified format can enhance performance of the program code generating a regular expression. In response to receiving the formatted query, the program code of regular expression generation program 170 having one or more performance optimization parameters determines whether the one or more performance optimization parameters are configured (e.g., initialized or set with a specified value) to optimize performance of generating a regular expression (decision block 205). Specifically, a system programmer/administrator can configure the one or more performance optimization parameters to optimize performance of the program code generating a regular expression. For example, the one or more performance optimization parameters can include a parameter to enable detection of syllables with a high degree of precision, and/or a boolean edit distance parameter that can be utilized by the program code to determine whether to associate a configurable numerical value to a concatenated set of characters.

If the one or more performance optimization parameters are not configured to optimize performance of generating a regular expression (decision block 205, "NO" branch), then the program code selects a character in the plain text word (block 210). Next, the program code identifies a group of characters from confusion matrix 180 that are most commonly confused with (i.e., most commonly substituted for or even transposed with) the character selected when spelling a word, thereby causing the word to be misspelled (block 225).

Otherwise, if the one or more performance optimization parameters are configured to optimize performance of generating a regular expression (decision block 205, "YES" branch), then the program code identifies syllables within the plain text word that are most likely to have incorrect substituted or transposed characters when spelling a word having a same number of syllables as the plain text word (block 215). Specifically, based on the number of syllables in the plain text word, the program code of regular expression generation program 170 can be configured to identify each of the syllables that have a high probability (e.g., a probability ranging from approximately 50% to about 99%) of spelling errors.

Data on probability of spelling errors based on the number of syllables in the plain text word may be collected from industry research and/or data analytics software 175 and utilized to configure the program code of regular expression generation program 170. Specifically, the data on the probability of spelling errors indicates syllables in which misspellings are most likely to occur within the plain text word, and can be utilized to configure the program code to select one or more of the syllables within the plain text word, in order to optimize performance of the program code generating a regular expression. For example, in the disclosed embodiment, the plain text word is "interembedded", which has five syllables. The data on probability of spelling errors, generated by data analytics software 175, indicates that the first, middle, and last syllables of five syllable words have a high probability of spelling errors. Accordingly, since the plain text word "interembedded" is a five syllable word, the program code is configured to select first syllable "in", middle syllable "em", and last syllable "ed". However, in other embodiments, the plain text word may be different and have a different number of syllables. Thus, the program code can be configured to select any combination of syllables or only a single syllable from the plain text word, by utilizing the data on probability of spelling errors generated by data analytics software 175.

Next, the program code selects each character in the syllables identified (block 220). Subsequently, for each character selected the program code identifies a group of characters from confusion matrix 180 that are most commonly confused with (i.e., most commonly substituted for or even transposed with) the character selected when spelling a word, thereby causing the word to be misspelled (block 225). In the disclosed embodiment, to identify the group of characters the program code searches confusion matrix 180 for three characters most commonly confused with the character selected by the program code. However, in other embodiments, to identify the group of characters the program code can search confusion matrix 180 for a top percentage of characters (e.g., top 80% of characters) most commonly confused with the character selected by the program code. Thus, the number of characters the program code searches for within confusion matrix 180, is configurable based on end-user requirements.

Subsequent to identifying the group of characters from confusion matrix 180, if the one or more performance optimization parameters are configured to optimize performance of generating a regular expression (decision block 230, "YES" branch), then the program code generates a set of characters, for each character selected, beginning with the character selected followed by and ending with the group of characters that are most commonly confused with the character selected (block 235). Next, the program code receives data from data analytics software (block 240).

If the program code determines from the data received that the character selected is not often omitted with a word (decision block 245, "NO" branch), then the program code generates a regular expression by concatenating each set of characters based on order that each character selected appears in the plain text word (block 250). The program code can associate a configurable numerical value to the concatenated set of characters if the boolean edit distance parameter is set (e.g., set to a value of one). The configurable numerical value represents an amount of variation allowed between a spelling of the plain text word and the spelling of a word subsequently identified within electronic repository 165, utilizing the regular expression that is generated, in order for the word to be considered a possible match with the plain text word. A system programmer/administrator can configure the numerical value based on end-user requirements.

However, if the program code determines from the data received that the character selected is often omitted within a word, based on number of syllables in the word or some other correlating factor, thereby causing the word to be misspelled (decision block 245, "YES" branch), then prior to generating a regular expression the program code tags the set of characters (block 260). For example, the tag can take many forms such as an ampersand, an asterisk, or a question mark. The program code treats the selected character within the set of characters that is tagged as optional, which means that the regular expression can be utilized to search for spelling of the plain text word, within text data, in which the selected character is omitted. Subsequently, the program code generates a regular expression by concatenating each set of characters based on order that each character selected appears in the plain text word (block 250). Next, the program code sends the regular expression to entity extraction program 160 (block 255), and then the program code ends. Entity extraction program 160 can utilize the regular expression to identify a word or a phrase having the word within text data (i.e., one or more strings of text) even if the word is misspelled, and to extract data associated to the word and/or the phrase from electronic repository 165.

Otherwise, if the one or more performance optimization parameters are not configured to optimize performance of generating a regular expression (decision block 230, "NO" branch), and if there is another character in the plain text word that has not been previously selected (decision block 265, "YES" branch), then the program code selects next character in the plain text word (block 270). Subsequently, the program code identifies a group of characters from confusion matrix 180 that are most commonly confused with (i.e., most commonly substituted for or even transposed with) the character selected when spelling a word, thereby causing the word to be misspelled (block 225). However, if there is not another character in the plain text word that has not been previously selected (decision block 265, "NO" branch), then the program code generates a regular expression by concatenating each set of characters based on order that each character selected appears in the plain text word (block 250). Next, the program code sends the regular expression to entity extraction program 160 (block 255), and then the program code ends. Entity extraction program 160 can utilize the regular expression to identify a word or a phrase having the word within text data (i.e., one or more strings of text) even if the word is misspelled, and to extract data associated to the word and/or the phrase from electronic repository 165.

FIG. 3 is illustrating data structure 300 as an example of confusion matrix 180. Data structure 300 includes columns 350-375 for each character in the English alphabet, and also includes rows 310-335 for each character in the English alphabet. Specifically, each column 350-375 represents a correct character within a word, and each row 310-335 represents an incorrect character that can be confused with (i.e., incorrectly substituted for or even incorrectly transposed with) the correct character. Therefore, each row and column combination indicates for a given sample size of words, the number of times the character represented by the column was confused with the character represented by the row thereby causing a word to be misspelled. For example, if a plain text word includes the character "i" represented by column 358, then data structure 300 indicates that for a given sample size of words the correct character "i" was confused one-hundred eighteen times with the incorrect character "a" represented by row 310 column 358, eighty-nine times with incorrect character "e" represented by row 314 column 358, thirteen times with incorrect character "l" represented by row 321 column 358, one time with incorrect character "n" represented by row 323 column 358, twenty-five times with incorrect character "o" represented by row 324 column 358, two times with incorrect character "p" represented by row 325 column 358, two times with incorrect character "r" represented by row 327 column 358, sixty-four times with incorrect character "u" represented by row 330 column 358, fifteen times with incorrect character "y" represented by row 334 column 358.

Accordingly, based on the given sample size of words, data structure 300 indicates the correct character "i" was confused with incorrect character "a" one hundred eighteen times out of a total of three hundred twenty-nine times (i.e., confused approximately 35.8% of the time), confused with incorrect character "e" eighty-nine times out of a total of three hundred twenty-nine times (i.e., confused approximately 27.1% of the time), confused with incorrect character "l" thirteen times out of a total of three hundred twenty-nine times (i.e., confused approximately 4% of the time), confused with incorrect character "n" one time out of a total of three hundred twenty-nine times (i.e., confused approximately 0.3% of the time), confused with incorrect character "o" twenty-five times out of a total of three hundred twenty-nine times (i.e., confused approximately 7.6% of the time), confused with incorrect character "p" two times out of a total of three hundred twenty-nine times (i.e., confused approximately 0.6% of the time), confused with incorrect character "r" two times out of a total of three hundred twenty-nine times (i.e., confused approximately 0.6% of the time), confused with incorrect character "u" sixty-four times out of a total of three hundred twenty-nine times (i.e., confused approximately 19.5% of the time), confused with incorrect character "y" fifteen times out of a total of three hundred twenty-nine times (i.e., confused approximately 4.6% of the time).

Figure 4:
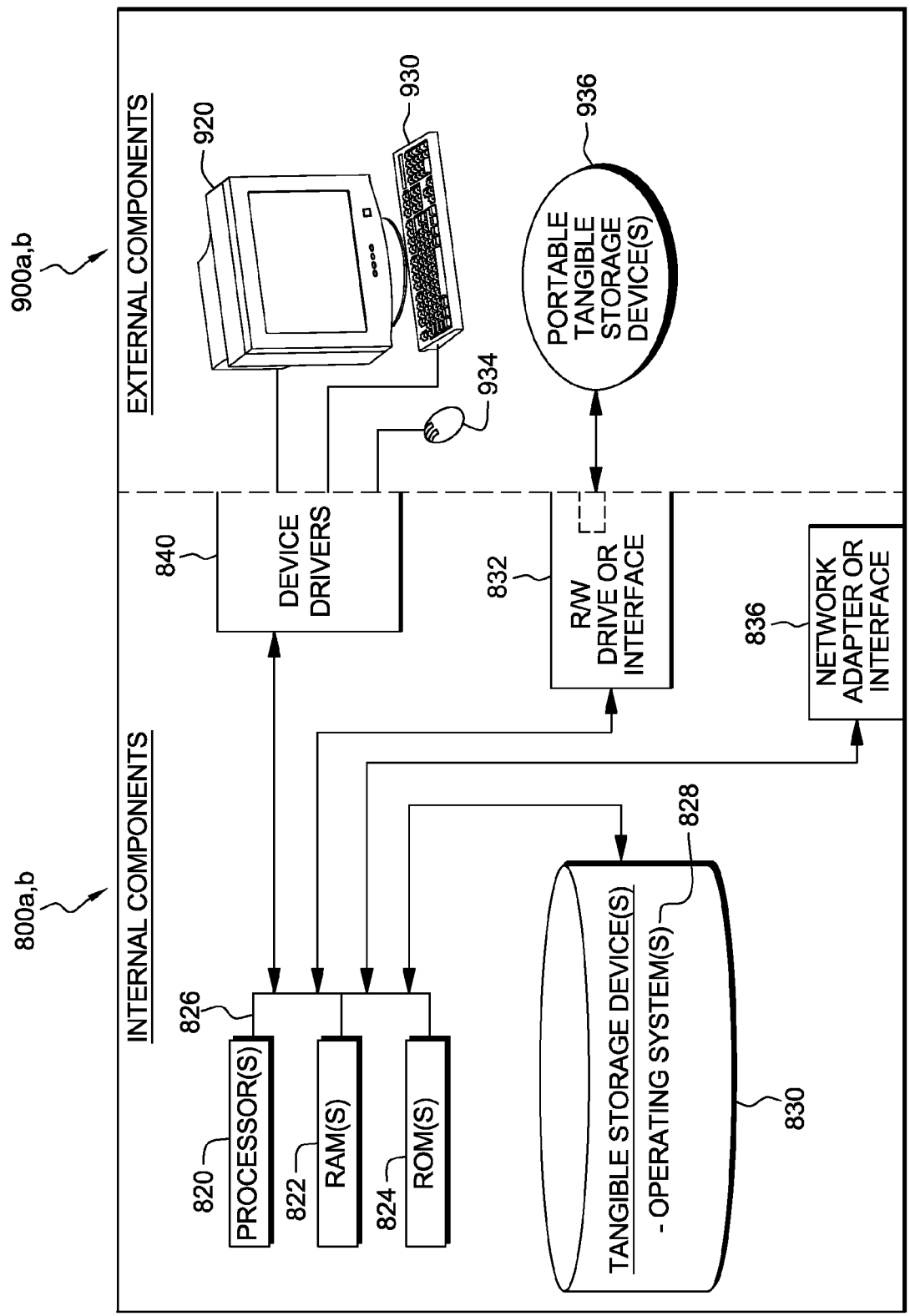
FIG. 4 is a block diagram depicting internal and external components of the client computer and the server computer of FIG. 1 according to an embodiment of the present invention.

FIG. 4 is a block diagram depicting a set of internal components 800a and a set of external components 900a that correspond to client computer 105a, as well as a set of internal components 800b and a set of external components 900b that correspond to server computer 105b. Internal components 800a and 800b each include one or more processors 820, one or more computer readable RAMs 822, one or more computer readable ROMs 824 on one or more buses 826, and one or more operating systems 828 and one or more computer readable tangible storage devices 830. The one or more operating systems 828 and regular expression generation program 170 on server computer 105b is stored on one or more of the respective computer readable tangible storage devices 830 for execution by one or more of the respective processors 820 via one or more of the respective RAMs 822 (which typically include cache memory). In the embodiment illustrated in FIG. 4, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800a and 800b includes a R/W drive or interface 832 to read from and write to one or more portable computer readable tangible storage devices 936 such as CD-ROM, DVD, memory stick, magnetic tape, magnetic disk, optical disk or semiconductor storage device. Regular expression generation program 170 on server computer 105b can be stored on one or more of the respective portable computer readable tangible storage devices 936, read via the respective R/W drive or interface 832 and loaded into the respective hard drive or computer readable tangible storage device 830.

Furthermore, each set of internal components 800a and 800b also includes a network adapter or interface 836 such as TCP/IP adapter card, wireless wi-fi interface card, or 3G or 4G wireless interface card or other wired or wireless communication link. Regular expression generation program 170 on server computer 105b can be downloaded to respective computer 105b from an external computer or external storage device via a network (for example, the Internet, a LAN, or a WAN) and respective network adapters or interfaces 836. From the network adapter or interface 836, regular expression generation program 170 on server computer 105b are loaded into respective hard drive or computer readable tangible storage device 830. The network may comprise copper wires, optical fibers, wireless transmission, routers, firewalls, switches, gateway computers and/or servers.

Each set of external components 900a and 900b can include a computer display monitor 920, a keyboard 930, and a computer mouse 934. External components 900a and 900b can also include touch screens, virtual keyboards, touch pads, pointing devices, and other human interface devices. Each set of internal components 800a and 800b also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 4 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Computer program code for carrying out operations for aspects of an embodiment of the invention may be written in any combination of one or more programming languages, including an object oriented programming language such as JAVA, Smalltalk, C++ or the like and conventional procedural programming languages, such as the "C" programming language or similar programming languages. The program code may execute entirely on the end-user's computer, partly on the end-user's computer, as a stand-alone software package, partly on the end-user's computer and partly on a remote computer, or entirely on a remote computer or server. In the latter scenario, the remote computer may be connected to the end-user's computer through any type of network, including a LAN or WAN, or the connection may be made to an external computer (for example, through the Internet using an Internet Service Provider). Alternatively, the functions of the aforementioned programs can be implemented in whole or in part by computer circuits and other hardware (not shown).

Based on the foregoing, a method, computer system, and computer program product have been disclosed for generating a regular expression, utilized for entity extraction, that can identify a word or a phrase having the word within text data (i.e., one or more strings of text) even if the word is misspelled. However, numerous modifications and substitutions can be made without deviating from the scope of an embodiment of the invention. Therefore, one or more embodiments of the invention have been disclosed by way of example and not limitation.

What is claimed is:

1. A method for generating a regular expression utilized for entity extraction, the method comprising the steps of:
   receiving a formatted query having a plain text word;
   setting a value to a Boolean edit distance parameter to determine whether to enhance performance of generating a regular expression, wherein the value is set by a user through a computer system;
   selecting each character in the plain text word;
   identifying a group of characters from a confusion matrix that are commonly confused with the character selected;
   generating a set of characters for each character selected, wherein the set of characters begin with one of the each character selected followed by and ending with the group of characters from the confusion matrix;
   generating a regular expression by concatenating each of the set of characters; and
   responsive to the value being set to the Boolean edit distance parameter, associating a configurable numerical value to the regular expression, wherein the configurable numerical value represents an amount of variation allowed between a spelling of the plain text word and a spelling of a word identified in a database by using the regular expression.

2. The method of claim 1, wherein the confusion matrix is implemented as a data structure.

3. The method of claim 1, wherein the step of identifying the group of characters comprises at least one of searching the confusion matrix for three characters most commonly confused with the character selected, and searching the confusion matrix for a percentage of characters commonly confused with the character selected.

4. The method of claim 1, wherein the step of generating the regular expression by concatenating each of the set of characters comprises concatenating each of the set of characters based on order that the each character selected appears in the plain text word.

5. A computer program product for generating a regular expression utilized for entity extraction, the computer program product comprising:
   a computer readable tangible storage device and program instructions stored on the computer readable tangible storage device, the program instructions include:
   program instructions to receive a formatted query having a plain text word;
   program instructions to set a value to a Boolean edit distance parameter to determine whether to enhance performance of generating a regular expression, wherein the value is set by a user through a computer system;
   program instructions to select each character in the plain text word;
   program instructions to identify a group of characters from a confusion matrix that are commonly confused with the character selected;
   program instructions to generate a set of characters for each character selected, wherein the set of characters begin with one of the each character selected followed by and ending with the group of characters from the confusion matrix;
   program instructions to generate a regular expression by concatenating each of the set of characters; and
   program instructions to, responsive to the value being set to the Boolean edit distance parameter, associate a configurable numerical value to the regular expression, wherein the configurable numerical value represents an amount of variation allowed between a spelling of the plain text word and a spelling of a word identified in a database by using the regular expression.

6. The computer program product of claim 5, wherein the confusion matrix is implemented as a data structure.

7. The computer program product of claim 5, wherein the program instructions to identify the group of characters comprises at least one of searching the confusion matrix for three characters most commonly confused with the character selected, and searching the confusion matrix for a percentage of characters commonly confused with the character selected.

8. The computer program product of claim 5, wherein the program instructions to generate the regular expression by concatenating each of the set of characters comprises concatenating each of the set of characters based on order that the each character selected appears in the plain text word.

9. A computer system for generating a regular expression utilized for entity extraction, the computer system comprising:
   one or more processors, one or more computer readable memories, one or more computer readable storage media, and program instructions stored on the one or more storage media for execution by the one or more processors via the one or more memories, the program instructions comprising:
   program instructions to receive a formatted query having a plain text word;
   program instructions to set a value to a Boolean edit distance parameter to determine whether to enhance performance of generating a regular expression, wherein the value is set by a user through the computer system;
   program instructions to select each character in the plain text word;
   program instructions to identify a group of characters from a confusion matrix that are commonly confused with the character selected;
   program instructions to generate a set of characters for each character selected, wherein the set of characters begin with one of the each character selected followed by and ending with the group of characters from the confusion matrix;

program instructions to generate a regular expression by concatenating each of the set of characters; and program instructions to, responsive to the value being set to the Boolean edit distance parameter, associate a configurable numerical value to the regular expression, wherein the configurable numerical value represents an amount of variation allowed between a spelling of the plain text word and a spelling of a word identified in a database by using the regular expression.

10. The computer system of claim 9, wherein the confusion matrix is implemented as a data structure.

11. The computer system of claim 9, wherein the program instructions to identify the group of characters comprises at least one of searching the confusion matrix for three characters most commonly confused with the character selected, and searching the confusion matrix for a percentage of characters commonly confused with the character selected.

12. The computer system of claim 9, wherein the program instructions to generate the regular expression by concatenating each of the set of characters comprises concatenating each of the set of characters based on order that the each character selected appears in the plain text word.

\* \* \* \* \*